United States Patent
Guha et al.

(10) Patent No.: US 10,844,204 B2
(45) Date of Patent: *Nov. 24, 2020

(54) THERMOPLASTIC FORMED WITH RENEWABLE CONTENT

(71) Applicant: CONTINENTAL STRUCTURAL PLASTICS, INC., Auburn Hills, MI (US)

(72) Inventors: Probir Kumar Guha, Troy, MI (US); Michael J. Siwajek, Rochester Hills, MI (US); Michael J. Hiltunen, Rochester, MI (US); Shane Skop, Auburn Hills, MI (US)

(73) Assignee: CONTINENTAL STRUCTURAL PLASTICS, INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/305,268

(22) PCT Filed: Jun. 15, 2015

(86) PCT No.: PCT/US2015/035841
§ 371 (c)(1),
(2) Date: Oct. 19, 2016

(87) PCT Pub. No.: WO2015/192135
PCT Pub. Date: Dec. 17, 2015

(65) Prior Publication Data
US 2017/0107366 A1    Apr. 20, 2017

Related U.S. Application Data

(60) Provisional application No. 62/011,949, filed on Jun. 13, 2014.

(51) Int. Cl.
*C08L 23/12*     (2006.01)
*C08K 7/14*      (2006.01)
(Continued)

(52) U.S. Cl.
CPC .............. *C08L 23/12* (2013.01); *C08J 3/005* (2013.01); *C08J 3/203* (2013.01); *C08K 7/14* (2013.01);
(Continued)

(58) Field of Classification Search
CPC ................................. C08K 7/14; C08L 23/12
(Continued)

(56) References Cited

U.S. PATENT DOCUMENTS 4,866,110 A * 9/1989 Lee .......................... C08K 7/12
                                                         524/11
8,642,683 B1 * 2/2014 Dellock ................. C08K 3/346
                                                         524/15

(Continued)

FOREIGN PATENT DOCUMENTS

| CN | 105778537 A * | 7/2016 | ............... C08K 7/14 |
| WO | 2013103999 A1 | 7/2013 | |
| WO | 2015150566 A1 | 10/2015 | |

OTHER PUBLICATIONS

Extended European Search Report dated Dec. 13, 2017 for European Application No. 15806688 filed Jun. 15, 2015.
(Continued)

*Primary Examiner* — Rip A Lee
(74) *Attorney, Agent, or Firm* — Blue Filament Law PLLC

(57) ABSTRACT

A molding composition formulation is provided that includes polypropylene, glass fiber, and a cellulosic powder used as a filler. The filler may be at least one of coconut shell powder, walnut shell powder, or rice hull. The molding
(Continued)

composition formulation may further include natural cellulosic fiber illustratively including at least one of coconut fibers, bamboo fibers, sugar cane fibers, or banana skin fibers. The molding composition may be compression moldable long fiber thermoplastic (LFTD). The molding composition formulation may be used in thermoforming. In a specific embodiment of the molding composition, the formulation proportion of the polypropylene is 50 to 60 percent of the formulation; and the polypropylene substitute is 5 to 15 percent of the formulation, and in an alternative embodiment, the formulation proportion of the polypropylene is 40 to 80 percent, the cellulosic powder is 1 to 25 percent, and the glass fiber is 1 to 50 percent.

7 Claims, 6 Drawing Sheets

(51) Int. Cl.
C08L 97/02 (2006.01)
C08L 1/02 (2006.01)
C08L 99/00 (2006.01)
C08J 3/00 (2006.01)
C08J 3/20 (2006.01)

(52) U.S. Cl.
CPC .............. *C08L 1/02* (2013.01); *C08L 97/02* (2013.01); *C08L 99/00* (2013.01); *C08J 2323/12* (2013.01); *C08J 2401/02* (2013.01); *C08L 2205/16* (2013.01); *C08L 2205/18* (2013.01); *C08L 2207/04* (2013.01)

(58) Field of Classification Search
USPC .................................................. 524/9, 13, 15
See application file for complete search history.

(56) References Cited

U.S. PATENT DOCUMENTS 9,499,688 B2 * 11/2016 Guha ........................ B29B 7/40
2002/0173583 A1 * 11/2002 Shimizu .................. C08L 23/10
524/515
2009/0176912 A1 7/2009 Maldas et al.
2012/0225976 A1 9/2012 Bampi
2012/0279421 A1 11/2012 Noda et al.
2017/0121493 A1 * 5/2017 Meyerhoff ........... C08K 11/005

OTHER PUBLICATIONS

A. Gregorova et al., "Radical Scavenging Capacity of Lignin and Its Effect on Processing Stabilization of Virgin and Recycled Polypropylene", Journal of Applied Polymer Science, vol. 106, 1626-1631 (2007).

Saman Ghahri et al., "Impact Strength Improvement of Wood Flour-Recycled Polypropylene Composites", Journal of Applied Polymer Science, vol. 124, 1074-1080 (2012).

J. Aurrekoetxea et al., "Effects of injection moulding induced morphology on the fracture behaviour of virgin and recycled polypropylene", Polymer 44, 6959-6964 (2003).

Mahendrasinh M. Raj et al., "Studies on Mechanical Properties of Recycled Polypropylene Blended with Virgin Polypropylene" (International Journal of Science Inventions Today, vol. 2, Issue 3, May-Jun. 2013.

* cited by examiner

| Description | 848H (Soy) | 848CS (Coconut) |
|---|---|---|
| FLEXURAL PROPERTIES | | |
| Flex Strength, (Mpa) | 182.17 | 196.73 |
| Flex Secant Modulus, (Mpa) | 11,434.4 | 9,722.8 |
| TENSILE PROPERTIES | | |
| Tensile Strength, (Mpa) | 65.5 | 70.4 |
| Tensile Modulus, (Mpa) | 14,152.4 | 12,318.2 |
| IZOD PROPERTIES | | |
| Izod Impact Unnotched, (kJ/m²) | 77.3 | 76.1 |
| Izod Impact Notched, (kJ/m²) | 77.9 | 79.9 |
| OTHER PROPERTIES | | |
| "Green" Content (% wt.) | 2.5 | 10.0 |
| Density (g/cc) | 1.87 | 1.66 |
| Water Absorption (%) | 0.29 | 0.40 |
| SMC Panel Length (in) | 10.002 | 10.000 |
| Micromet Data: CP2 (sec) | 13.8 | 16.1 |
| Micromet Data: CP3 (sec) | 25.8 | 26.9 |
| Micromet Data: CP4 (sec) | 49.5 | 44.4 |
| DYNE DATA | | |
| Average | 45.1 | 46.4 |

FIG. 3

| Description | Control | 5% CS | 10% CS |
|---|---|---|---|
| FLEXURAL PROPERTIES | | | |
| Flex Strength (Mpa) | 98.4 | 106.4 | 103.2 |
| Flex Modulus (Mpa) | 3949.7 | 4513.8 | 4597.4 |
| TENSILE PROPERTIES | | | |
| Tensile Strength (Mpa) | 72.7 | 65.2 | 62.0 |
| Tensile Modulus (Mpa) | 5,740.0 | 4,071.4 | 5,699.7 |
| IZOD PROPERTIES | | | |
| Izod Impact Unnotched (kJ/m²) | 35.8 | 40.2 | 40.2 |
| Izod Impact Notched (kJ/m²) | 24.1 | 51.6 | 29.3 |
| OTHER PROPERTIES | | | |
| % "Green" (by weight) | 0.0 | 5.0 | 10.0 |
| Density (g/cc) | 1.19 | 1.18 | 1.17 |
| Glass Content (%wt.) | 36.50 | 36.70 | 33.90 |
| Water Absorption (%) | -0.01 | 0.02 | 0.01 |

FIG. 4

THERMOPLASTIC FORMED WITH RENEWABLE CONTENT

CROSS-REFERENCE TO RELATED APPLICATION

This application claims priority of U.S. Provisional Patent Application Ser. No. 62/011,949 filed Jun. 13, 2014, which is incorporated herein by reference.

FIELD OF THE INVENTION

The present invention in general relates to thermoplastic molding compositions and in particular to thermoplastics formed with renewable content.

BACKGROUND OF THE INVENTION

Thermoforming is a manufacturing process where a plastic sheet is heated to a pliable forming temperature, formed to a specific shape in a mold, and trimmed to create a usable product. The sheet, or "film" when referring to thinner gauges and certain material types, is heated in an oven to a high-enough temperature that the plastic can be stretched into or onto a mold and cooled to a finished shape. Thick-gauge thermoforming includes parts as diverse as vehicle door and dash panels, refrigerator liners, utility vehicle beds, and plastic pallets. Thermoforming companies often recycle their scrap and waste plastic, either by compressing in a baling machine or by feeding into a granulator (grinder) and producing ground flake, for sale to reprocessing companies or re-use in their own facility. Frequently, scrap and waste plastic from the thermoforming process is converted back into extruded sheet for forming again, as well as pellets for injection molding.

Polypropylene (PP) is a thermoplastic polymer used in a wide variety of applications including packaging, textiles, plastic parts and reusable containers of various types, laboratory equipment, and automotive components. Thermoplastic is a polymer that turns to a liquid when heated and freezes to a very glassy state when cooled sufficiently. Thermoplastic polymers differ from thermosetting polymers (Bakelite) in that thermoplastic can be remelted and remolded. A polymer is a large molecule (macromolecule) composed of repeating structural units called monomers. Monomers are typically connected to each other by covalent chemical bonds.

Polypropylene has a linear structure based on the monomer $-(CH(CH_3)CH_2)_n-$. Polypropylene is manufactured from propylene gas in presence of a catalyst such as titanium chloride. Thus, polypropylene is a by-product of oil refining processes, and is petroleum based. In order to modify some material properties of polypropylene, polypropylene formulas typically include additives such as pigments, carbon black, rubbers, antioxidants, and UV stabilizer. Polypropylene is available as molding powder, extruded sheet, cast film, textile staple, and continuous filament yarn.

The dependency of polypropylene on a petroleum base results in a varying price of polypropylene with rising and falling prices of oil and oil availability. Thus, there exists a need for lowering the percentage of virgin polypropylene content in materials, such as thermoforming and compression moldable thermoplastics including compression moldable long fiber thermoplastic (LFTD), to reduce polypropylene usage. In addition, the reduction in polypropylene content has a positive environmental impact as well by using "green" or agricultural based products.

SUMMARY OF THE INVENTION

A molding composition formulation is provided that includes polypropylene, glass fiber, and a cellulosic powder used as a filler. Inventive embodiments of the molding composition formulation may have a filler that is at least one of coconut shell powder, walnut shell powder, or rice hull. The inventive molding composition formulation may further include a natural cellulosic fiber illustratively including at least one of coconut fibers, bamboo fibers, sugar cane fibers, or banana skin fibers. In a specific embodiment the inventive molding composition is a compression moldable long fiber thermoplastic (LFTD). Embodiments of the inventive molding composition formulation may be used in thermoforming. In a specific inventive embodiment of the molding composition, the formulation proportion of the polypropylene is 50 to 60 percent of the formulation; and the polypropylene substitute is 5 to 15 percent of the formulation. In a specific inventive embodiment of the molding composition, the formulation proportion of the polypropylene is 40 to 80 percent, the cellulosic powder is 1 to 25 percent, and the glass fiber is 1 to 50 percent.

A process for producing a molding composition is provided that includes mixing and compounding renewable content to form a polypropylene substitute composition, and combining the polypropylene substitute composition with polypropylene, one or more additives, and glass fiber. In a specific embodiment of the process of the mixing and combing is done with a twin-screw extruder. In specific embodiments of the inventive process, renewable content is a cellulosic natural filler that may be at least one of coconut shell powder, walnut shell powder, or rice hull. In specific embodiments of the inventive process, renewable content is a natural cellulosic fiber that may be at least one of coconut fibers, bamboo fibers, sugar cane fibers, or banana skin fibers. Embodiments of the inventive process may be used to produce a composition that is a compression moldable long fiber thermoplastic (LFTD). Embodiments of the inventive process may be used to produce a composition that is for used in thermoforming. The formulation proportion used in a specific embodiment of the inventive process may be polypropylene as 50 to 60 percent of the formulation, where the polypropylene substitute is 5 to 15 percent of the formulation. The formulation proportion used in a specific embodiment of the inventive process may be polypropylene as 40 to 80 percent of the formulation, where the cellulosic powder is 1 to 25 percent, and the glass fiber is 1 to 50 percent.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates a comparison table of mechanical properties of an SMC material with a soy based filler and coconut shell based filler;

FIG. 4 illustrates a comparison table with mechanical properties for long fiber thermoplastic (D-LFT) with a 5% and 10% coconut shell based filler;

DESCRIPTION OF THE INVENTION

The present invention has utility as an economical and environmentally friendly substitute for lowering polypropylene (PP) content in thermoforming and compression moldable thermoplastics. The introduction of recycled and renewable content in the place of polypropylene, reduces the use of the higher cost polypropylene, and helps to reduce potential pollution that may be released to the environment during the production of polypropylene. Thermoforming, injection, and compression molding of thermoplastics all benefit from the inclusions of the present invention.

Cellulosic powder fillers are introduced into thermoforming and compression moldable thermoplastic materials as a substitute for polypropylene content in the base formulation. Such cellulosic natural fillers operative herein illustratively include coconut shell powder; treenut shell powder; peanut shell; grains hull and husks illustratively including rice, wheat, and coconut husk fiber. Typical powders have a particle size distribution from 5 microns to 200 microns, and more preferably between 15 microns to 100 microns.

Cellulosic fibers may also be introduced in concert with cellulosic powder fillers into thermoforming, injection moldable, and compression moldable thermoplastic materials as a substitute for polypropylene content in the base formulation. Cellulosic natural fibers operative herein illustratively include coconut fibers, bamboo fibers, sugar cane fibers, banana skin fibers, hemp, cane, jute, silk, and coconut husk.

Figure 1:
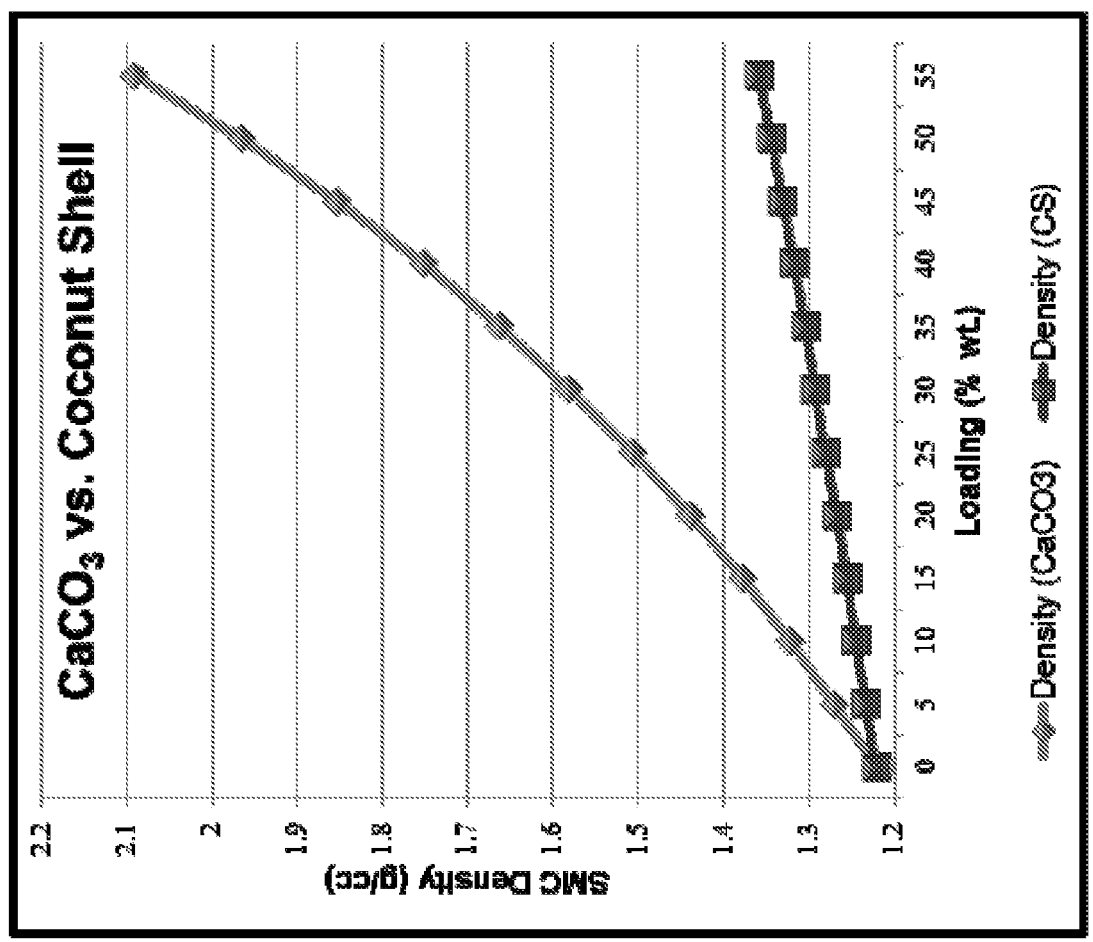
FIG. 1 is a graph of sheet molding composition (SMC) density versus loading (% weight) for calcium carbonate versus coconut shell based filler.
Figure 2:
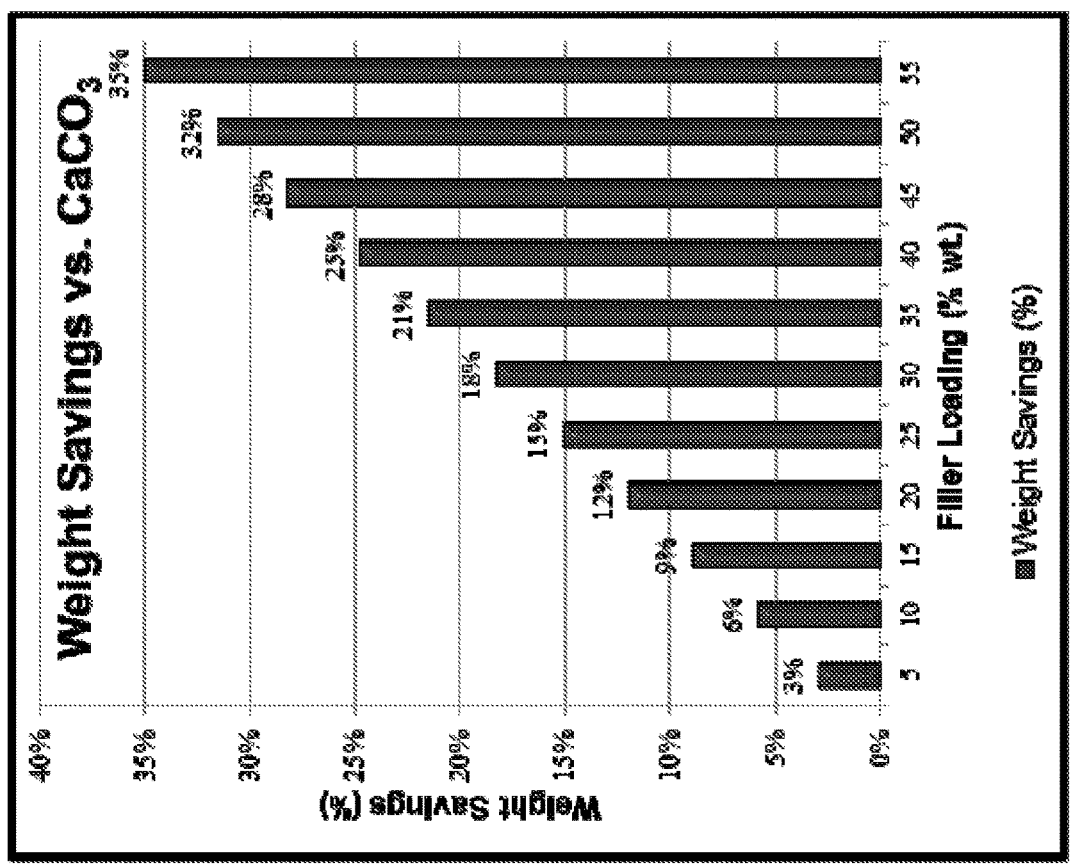
FIG. 2 is a graph based on percentages of the weight savings versus filler loading for coconut shell versus calcium carbonate.

The use of "green" agricultural cellulosic based fillers and fibers act to reduce material density and costs while still meeting specified mechanical requirements for the finished thermoformed and compression moldable articles and parts. For example, fillers obtained from coconut shells provide up to a fifty six percent (56%) reduction in density compared to mineral fillers such as calcium carbonate ($CaCO_3$)—1.2 g/cc for coconut shell vs. 2.7 g/cc for calcium carbonate. Lower material density contributes to lower part weights which is important for energy efficiency in vehicles and other applications. In addition, natural fillers have isotropic mechanical properties. FIG. 1 is a graph of sheet molding composition (SMC) density versus loading (% weight) for calcium carbonate versus coconut shell based filler. FIG. 2 is a graph based on percentages of the weight savings versus filler loading for coconut shell versus calcium carbonate.

Fillers based on coconut shells are resistant to odor and mildew, and provide isotropic properties, stiffness, and good thermal properties to compound materials. Furthermore, coconut shell based fillers have a lower water absorption than other natural fillers tested (e.g., walnut shell, rice hull ash, wood flour, pecan shell, egg shell, etc.), and are more economically competitive than traditional low density (LD) fillers. FIG. 3 is a table of a comparison of mechanical properties for SMC with a soy based filler and a coconut shell based filler. The strength of the SMC was maintained or improved even though the percentage of natural filler was increased from 2.5% of soy to 10% of coconut based filler. The 400% increase in green content provides a 10% weight savings with no changes in molding or paintability, with an equivalent surface appearance.

FIG. 4 is a table of a comparison of mechanical properties for long fiber thermoplastic (D-LFT) with a 5% and 10% coconut shell based filler. D-LFT is in-line compounded thermoplastic with long glass fiber. D-LFT yields high strength and high impact composites that are capable of molding complex part geometries. As shown in FIG. 4 the introduction of green content in the form of coconut shell in place of polypropylene resulted in no reduction in mechanical properties, and yields an increase in material flex properties.

Figure 5:
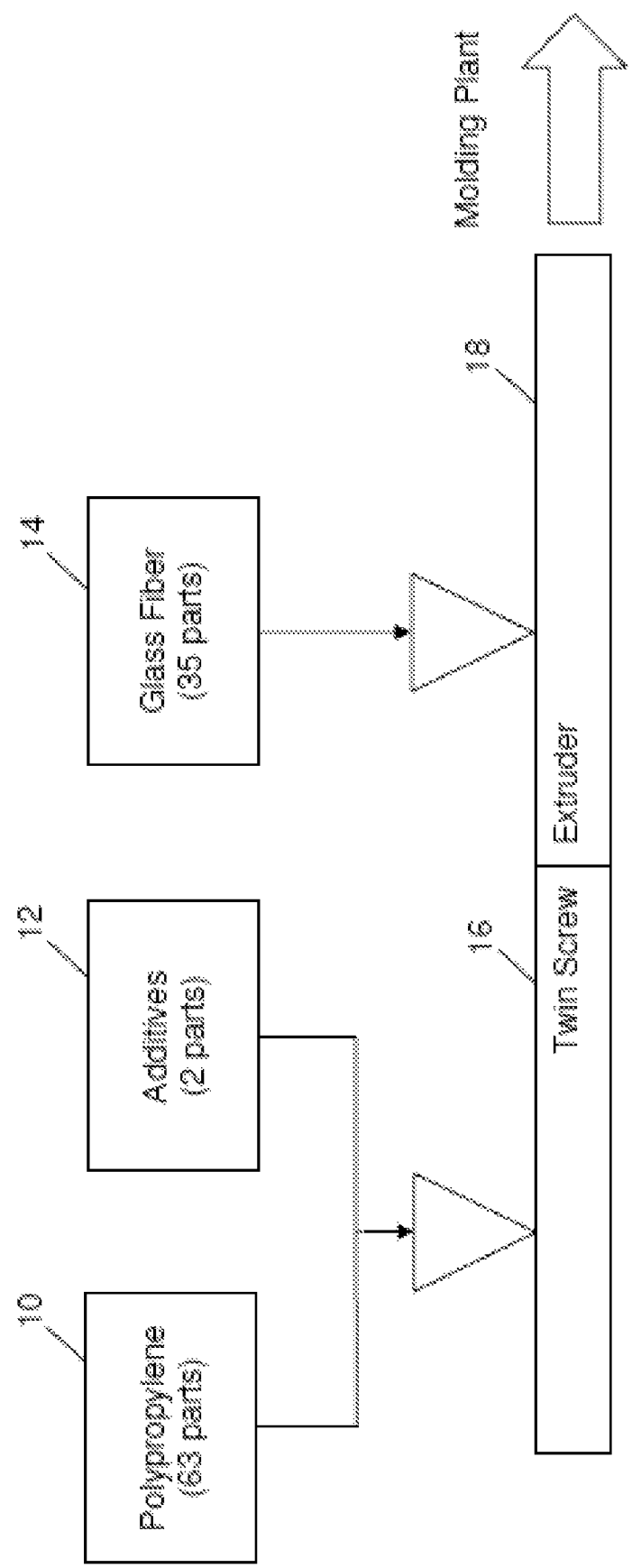
FIG. 5 is a block diagram of a prior art formulation and process for compression moldable long fiber thermoplastics formed primarily with polypropylene and glass fiber.

FIG. 5 is a block diagram of a typical formulation and process for compression moldable long fiber thermoplastics formed with primarily with polypropylene 10 and glass fiber 14. In the standard formulation of FIG. 5 the polypropylene 10 and additives 12 are mixed and compounded in the twin-screw extruder 16, and then combined with glass fiber 14 in extruder 18. The prior art conventional formulation for the compression moldable long fiber thermoplastic (LFTD) of FIG. 5 is a majority of polypropylene 10 at a given loading such as 45 to 80 parts, and in the example as shown in FIG. 5 of 63 parts of the total thermoplastic composition. Glass fiber 14 is provided at a loading of typically between 10 and 40 parts to impart strength to the resultant article. As provided in FIG. 5, the glass fiber 14 is present at 35 parts. A small amount of additives 12 are optionally provided to control material properties of the polypropylene. The additives 12 are provided at a loading of typically between 0 and 10 parts. As provided in FIG. 5, the additives 12 are present at 2 parts. The typical and preferred prior art formulations are provided in Table 1 below:

TABLE 1

| Conventional PP Compression Molding Composition | | |
|---|---|---|
| Material | Typical amount in parts by weight | Exemplary amount in parts by weight in FIG. 1 |
| Polypropylene | 45-80 | 63 |
| Additives | 0-10 | 2 |
| Glass Fiber | 10-40 | 35 |

Figure 6:
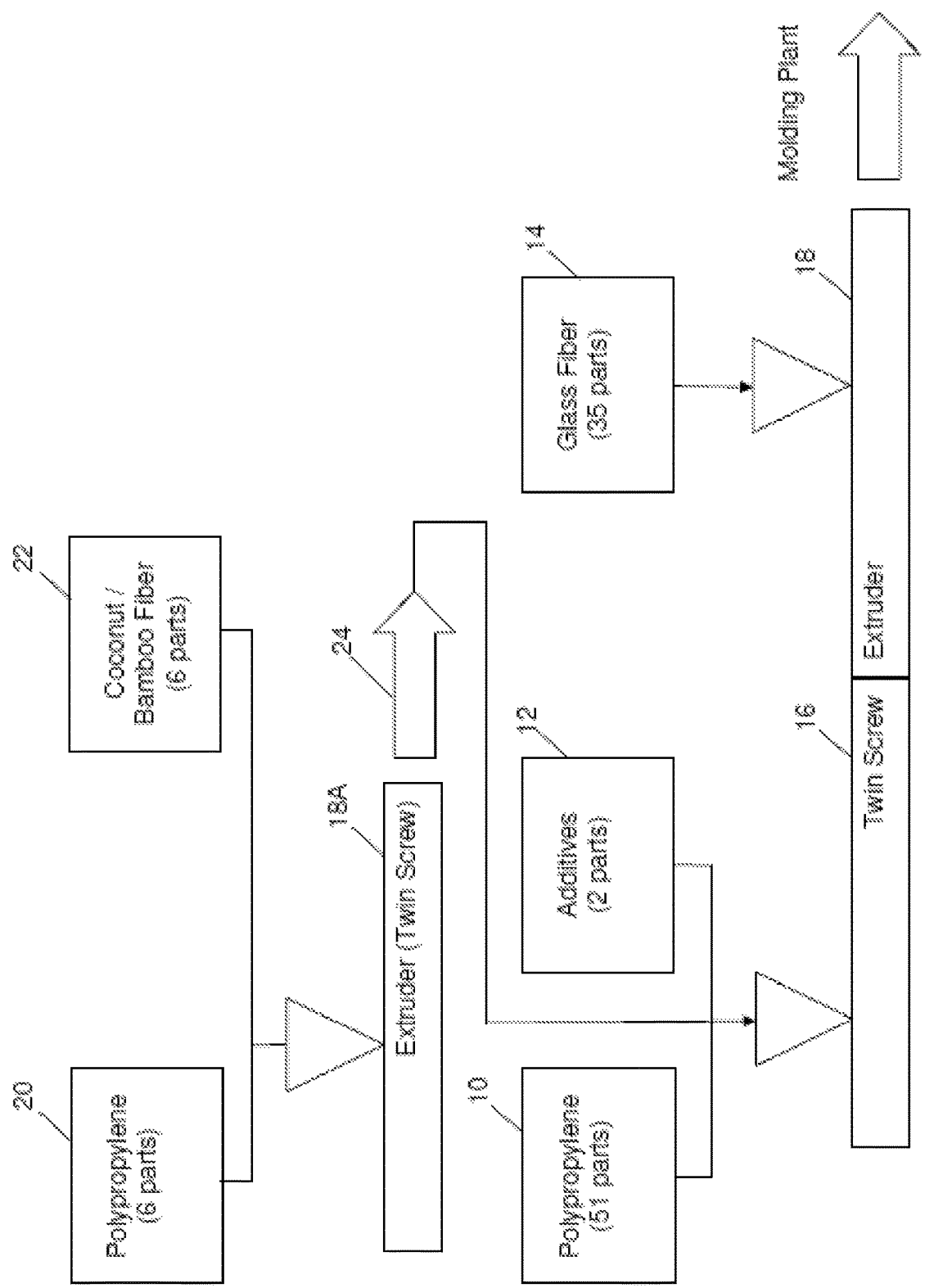
FIG. 6 is a block diagram of an inventive formulation and process for compression moldable long fiber thermoplastics formed with a portion of the polypropylene replaced with renewable content.

FIG. 6 is a block diagram of an inventive formulation and process for a thermoforming and compression moldable long fiber thermoplastics formed with a portion of the polypropylene 10 replaced with renewable content, such as cellulosic powder fillers. Cellulosic fiber 22 is provided at a loading of typically between 0 and 15 parts by weight. As provided in FIG. 6, the cellulosic fiber 22 is present at 6 parts by weight. A representative cellulosic fiber 22 is coconut and/or bamboo fiber. The fiber 22 is mixed with polypropylene 20 (6 parts) in an extruder and compounded to form pellets 18A to form a substitute composition 24. The extruder 18A is an otherwise conventional extruder such as a single screw or a double screw extruder with the appreciation that degree of homogeneity is controlled through manipulation of extruder operating parameters. The substitute composition in pellet form 24 is subsequently combined with polypropylene 10 and additives 12 to form a homogeneous composition with resort to twin-screw extruder 16. Extruder 18 combines the glass fiber 14 with the other components to form the inventive LFTD for molding and further processing. Further processing preferably includes thermoforming or compression molding to form an article in a mold. Exemplary loadings of various components are depicted in FIG. 6. It is appreciated that the glass fiber 14 may be in numerous forms illustratively including chopped fibers, roving, and mats.

With usage of substitute composition 24 formed from renewable content allows for a reduction in the amount of virgin polypropylene 10 in the inventive LFTD versus the traditional LFTD of FIG. 5.

The inventive composition is provided in Table 2 relative to the conventional composition of Table 1.

TABLE 2

Typically values for an inventive composition.

| Material | Amount | Typical amount in parts by weight | Exemplary amount in parts by weight in FIG. 4 |
|---|---|---|---|
| Polypropylene | 35-80% of Table 1 amount | 70 | 36 |
| Additives | 0% to 10% of Table 1 amount | 2 | 2 |
| Glass Fiber | 15% to 50% of Table 1 amount | 30 | 35 |
| Cellulosic Powder | 0% to 25% | 5 | 6 |
| Cellulosic Fiber | 0% to 25% | 5 | 6 |

It is noted that the formulation percentages of the separate components of the inventive LFTD may be varied in different embodiments in accordance with an intended application for the LFTD Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A molding composition consisting of:
   15 to 65 weight percent of said formulation virgin polypropylene;
   10 to 40 weight percent of said formulation glass fiber; and
   1 to 25 weight percent of said formulation coconut shell powder or walnut shell powder as a filler.

2. The molding composition of claim 1 wherein a proportion of said virgin polypropylene is 50 to 60 weight percent of said molding composition; and
   wherein a proportion of said coconut shell powder or walnut shell powder is 5 to 15 weight percent of said molding composition.

3. The molding composition of claim 1 wherein said filler is coconut shell powder.

4. A process for producing a molding composition comprising:
   mixing and compounding natural cellulosic powder and natural cellulosic fibers to form a polypropylene substitute composition; and
   combining said polypropylene substitute composition with virgin polypropylene, and glass fibers;
   wherein said molding composition consists of 15 to 65 weight percent virgin polypropylene, 10 to 40 weight percent glass fibers, and 1 to 25 weight percent coconut shell powder or walnut shell powder as a filler, and 1 to 25 weight percent natural cellulosic fibers.

5. The process of claim 4 wherein said mixing and combining is performed with a twin-screw extruder.

6. The process of claim 4 wherein said natural cellulosic fiber is at least one of coconut fibers, bamboo fibers, sugar cane fibers, or banana skin fibers.

7. The process of claim 4 wherein a composition proportion of said virgin polypropylene is 50 to 60 weight percent; and wherein a composition proportion of said polypropylene substitute is 5 to 15 weight percent.

* * * * *